(12) United States Patent
Schneider et al.

(10) Patent No.: US 8,100,242 B2
(45) Date of Patent: Jan. 24, 2012

(54) BICYCLE WHEEL HUB

(75) Inventors: Marcus Schneider, Hofheim (DE);
Karl-Joachim Kühne, Oberwerrn (DE)

(73) Assignee: SRAM Deutschland GmbH,
Schweinfurt (DE)

( * ) Notice: Subject to any disclaimer, the term of this patent is extended or adjusted under 35 U.S.C. 154(b) by 468 days.

(21) Appl. No.: 12/402,406

(22) Filed: Mar. 11, 2009

(65) Prior Publication Data

US 2009/0230758 A1    Sep. 17, 2009

(30) Foreign Application Priority Data

Mar. 11, 2008   (DE) .................... 20 2008 003 482 U

(51) Int. Cl.
*F16D 41/26* (2006.01)
*F16D 41/30* (2006.01)

(52) U.S. Cl. ......... 192/64; 192/43.1; 192/47; 192/114 R
(58) Field of Classification Search ...................... 192/64
See application file for complete search history.

(56) References Cited

U.S. PATENT DOCUMENTS

| 2,395,576 A | * | 2/1946 | Moroney ...................... 192/43.1 |
| 3,432,015 A | * | 3/1969 | Schwerdhofer .............. 192/43.1 |
| 3,701,292 A | | 10/1972 | Schulz |

FOREIGN PATENT DOCUMENTS

| GB | 4 46 136 | 4/1936 |
| GB | 4 51 299 | 8/1936 |
| GB | 10 16 641 | 1/1966 |

* cited by examiner

*Primary Examiner* — David D Le
*Assistant Examiner* — Jacob S Scott
(74) *Attorney, Agent, or Firm* — Milan Milosevic; Lisa Serdynski; Steven B. Courtright

(57) ABSTRACT

The present invention provides a bicycle wheel hub that generally includes an axle, an input sprocket, an output shell, a one-way clutch and a locking mechanism. The one-way clutch operatively connects the input sprocket and the output shell and is configured to drive the output shell in a first direction. The locking mechanism is configured to operatively connect the output shell and the input sprocket to drive the output shell in a second direction to operate the bicycle wheel hub in a fixed drive mode. The locking mechanism is configured to operatively disconnect the output shell and the input sprocket to operate the bicycle wheel hub in a freewheel drive mode.

3 Claims, 1 Drawing Sheet

BICYCLE WHEEL HUB

BACKGROUND OF THE INVENTION

The present invention relates to bicycle wheel hubs and more particularly to a bicycle wheel hub configured to be alternatively operated between a fixed drive mode and a freewheel drive mode.

A conventional bicycle rear wheel hub may include two alternatively-operable sprockets on opposite ends of the wheel hub. One sprocket is fixed to the hub sleeve to operate the wheel hub in a fixed drive mode wherein rotation of the pedals in the forward and rearward directions is directly transmitted to forward and rearward rotations of the rear wheel. The other sprocket is operatively connected to a freewheel driver which transmits forward rotation of the pedals to the rear wheel but permits freewheel rotation of the rear wheel while coasting in a freewheel drive mode when not pedaling.

The disadvantage of this configuration is that the bicyclist must remove the rear wheel from the bicycle frame and flip the wheel 180 degrees to alternatively engage only one of the sprockets with a drive chain connected to the pedals. Therefore, there is a need for a device that permits the bicyclist to alternate between the fixed and freewheel drive modes without having to remove the wheel from the bicycle.

SUMMARY OF THE INVENTION

The present invention provides a bicycle wheel hub operable between a fixed drive and a freewheel drive mode without removing the wheel from the bicycle or without the aid of special tools. The bicycle wheel hub generally includes an axle, an input sprocket, an output shell, a one-way clutch and a locking mechanism. The one-way clutch operatively connects the input sprocket and the output shell and is configured to drive the output shell in a first direction. The locking mechanism is configured to operatively connect the output shell and the input sprocket to drive the output shell in a second direction to operate the bicycle wheel hub in a fixed drive mode. The locking mechanism is configured to operatively disconnect the output shell and the input sprocket to operate the bicycle wheel hub in a freewheel drive mode.

In one embodiment of the present invention, the locking mechanism is operable from outside the bicycle wheel hub to operatively connect and disconnect the output shell and the input sprocket. The locking mechanism includes a first pawl biased to operatively connect the output shell and the input sprocket. The locking mechanism further includes a control member displaceable to engage the pawl to operatively disconnect the output shell and the input sprocket. The axle has a coaxial bore. The locking mechanism further includes a control pin connected to and displacing the control member, the control pin slidably disposed in the coaxial bore. The control pin is threadably connected to the axle to slidably displace the control pin. The shift pin includes an end disposed outside of the hub and having a torque-transmitting profile for receiving an input torque from a rider's hand or a tool.

These and other features and advantages of the present invention will be more fully understood from the following description of one or more embodiments of the invention, taken together with the accompanying drawings.

DETAILED DESCRIPTION

Figure 1:
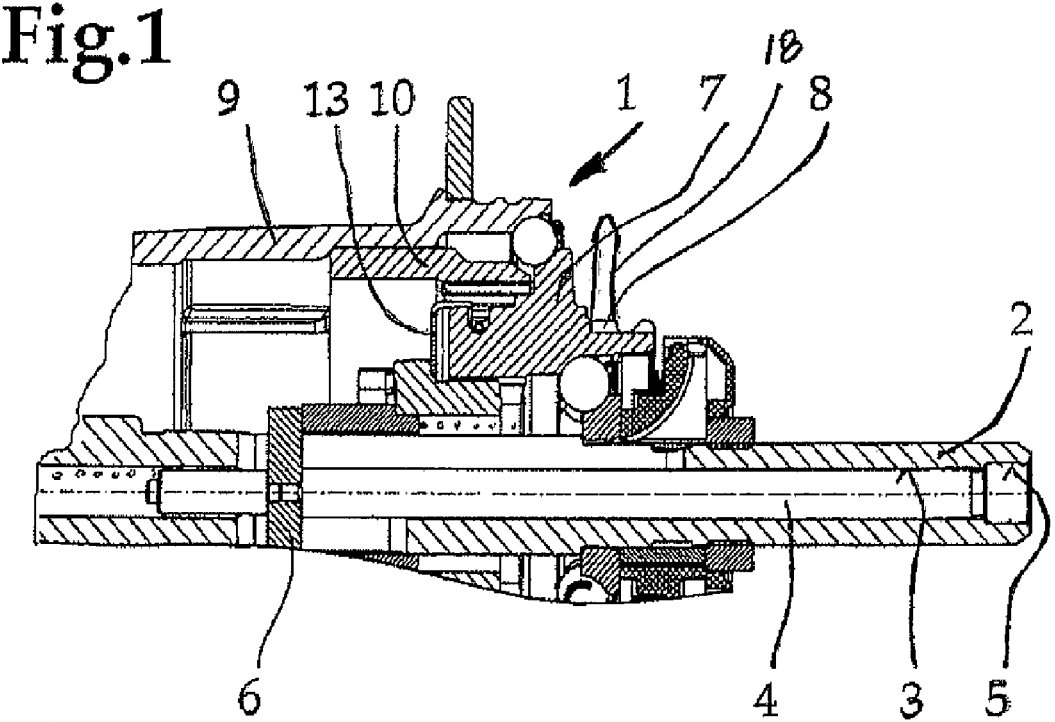
FIG. 1 is a partial cross-sectional view of a bicycle rear wheel hub according to one embodiment of the present invention.
Figure 2:
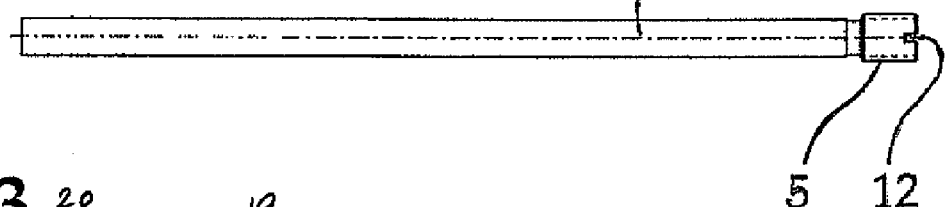
FIG. 2 is a side view of a shift pin of the bicycle rear wheel hub of FIG. 1.
Figure 3:
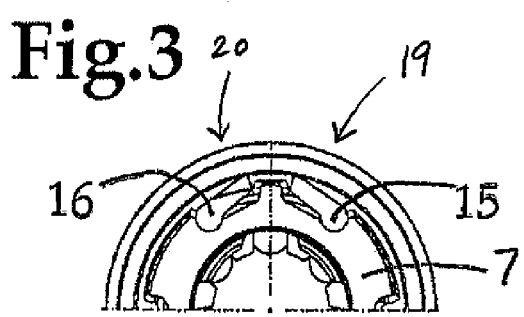
FIG. 3 is a partial cross-sectional view of a driver and first and second pawls of the bicycle rear wheel hub of FIG. 1.
Figure 4:
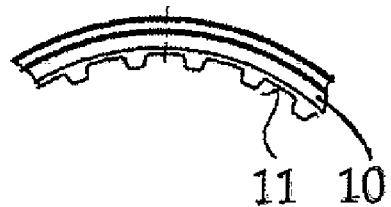
FIG. 4 is a partial view of a plurality of teeth on a tooth ring of the bicycle rear wheel hub of FIG. 1.
Figure 5:
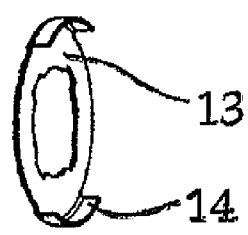
FIG. 5 is a perspective view of a control member of the bicycle rear wheel hub of FIG. 1.
Figure 6:
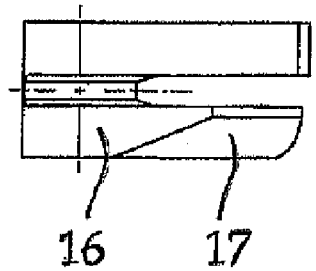
FIG. 6 is a top view of the first pawl having an actuation slope of the bicycle rear wheel hub of FIG. 1.

FIGS. 1-6 show a rear wheel hub 1 according to one embodiment of the present invention. The rear wheel hub 1 generally includes an axle 2 having a coaxial bore 3, an output shell 9, an input sprocket 18, a one-way clutch 19 and a locking mechanism 20. The input sprocket 18 is connected a driver 7 at a seat 8. The locking mechanism 20 includes a first pawl 16 seated on the driver 7. The first pawl 16 is biased to engage a plurality of teeth 11 on a tooth ring 10 on a first drive side of the teeth 11. The tooth ring 10 is fixedly connected to the output shell 9. The one-way clutch 19 includes a second pawl 15 seated on the driver 7. The second pawl 15 is biased to engage the plurality of teeth 11 on the tooth ring 10 on a second drive side of the teeth 11.

The locking mechanism 20 includes a control pin 4 slidably displaceable within the bore 3 and has a thread 5 to threadably connect to the axle 2. An axially spring-loaded sliding key 6 is connected to and displaceable with the control pin 4. A control member 13 having tabs 14 is axially displaceable, the tabs 14 traversing an actuation slope 17 of the first pawl 16, to operatively disconnect the output shell 9 and the input sprocket 18. An exterior end of the control pin 4 includes a torque-transmitting profile 12 for receiving an input torque from a rider's hand or a tool such as a screwdriver. A cap may cover the bore 3 to seal against dirt and protect against damage.

To operate the hub 1 in a freewheel drive mode, the control pin 4 is rotated by hand or with a tool to axially displace the sliding key 6, and in turn, displace the control member 13 to disengage the first pawl 16 of the locking mechanism 20 from the tooth ring 10. So adjusted, when the rider pedals forward the driver 7 is rotated in a first direction, and in turn, the second pawl 15 drives the tooth ring 10 by engaging the first drive side of the teeth 11 to drive the output shell 9 in the first direction. When the rider stops pedaling and coasts, the one-way clutch 19 freely rotates to permit rotation of the output shell 9 relative to the input sprocket 18.

To operate the hub 1 in a fixed drive mode, the control pin 4 is rotated in another direction by hand or with a tool to axially displace the sliding key 6, and in turn, displace the control member 13 to engage the first pawl 16 of the locking mechanism 20 to the tooth ring 10. So adjusted, when the rider pedals backwards the driver 7 is rotated in a second direction, and in turn, the second pawl 15 drives the tooth ring 10 by engaging the second drive side of the teeth 11 to drive the output shell 9 in the second direction. So adjusted, when the rider pedals forward, the second pawl 15 continues to drive the tooth ring 10 by engaging the first drive side of the teeth 11 to drive the output shell 9 in the first direction as in the freewheel drive mode.

In another embodiment of the present invention, the control pin 4 may be actuated by an external handlebar-mounted control device connected to the control pin by a Bowden cable permitting on-the-fly changeover between the freewheel and the fixed drive modes.

In another embodiment of the present invention, a dog clutch may be used to implement the present invention. In a manner analogous to manually-shifted auto transmissions, axially-acting dog clutches may be coupled with cooperating features on the hub shell.

While this invention has been described by reference to one or more embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A bicycle wheel hub comprising:
   an axle;
   an input sprocket;
   an output shell;
   a one-way clutch operatively connecting the input sprocket and the output shell, the one-way clutch configured to drive the output shell in a first direction; and
   a locking mechanism configured to operatively connect the output shell and the input sprocket to drive the output shell in a second direction to operate the bicycle wheel hub in a fixed drive mode, the locking mechanism configured to operatively disconnect the output shell and the input sprocket to operate the bicycle wheel hub in a freewheel drive mode;
   wherein the locking mechanism is operable from outside the bicycle wheel hub to operatively connect and disconnect the output shell and the input sprocket;
   wherein the locking mechanism includes a first pawl biased to operatively connect the output shell and the input sprocket, the locking mechanism further including a control member displaceable to engage the pawl to operatively disconnect the output shell and the input sprocket;
   wherein the axle has a coaxial bore, the locking mechanism further including a control pin connected to and displacing the control member, the control pin slidably disposed in the coaxial bore.

2. The bicycle rear wheel hub of claim 1, wherein the control pin is threadably connected to the axle to slidably displace the control pin.

3. The bicycle rear wheel hub of claim 2, wherein the control pin includes an end disposed outside of the hub and having a torque-transmitting profile for receiving an input torque from one of a rider's hand and a tool.

* * * * *